(12) United States Patent
Brooks et al.

(10) Patent No.: US 10,251,385 B2
(45) Date of Patent: Apr. 9, 2019

(54) APPARATUS FOR DETERMINING AN APPLICATION RATE FOR A PRODUCT DELIVERED BY AN AGRICULTURAL VEHICLE

(71) Applicant: CNH Industrial America LLC, New Holland, PA (US)

(72) Inventors: Nathan Paul Brooks, Manitowoc, WI (US); Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 31 days.

(21) Appl. No.: 15/496,204

(22) Filed: Apr. 25, 2017

(65) Prior Publication Data

US 2017/0223946 A1 Aug. 10, 2017

Related U.S. Application Data

(62) Division of application No. 14/699,724, filed on Apr. 29, 2015, now Pat. No. 9,655,355.

(51) Int. Cl.
*A01M 7/00* (2006.01)
*A01C 21/00* (2006.01)
(Continued)

(52) U.S. Cl.
CPC ......... *A01M 7/0089* (2013.01); *A01B 79/005* (2013.01); *A01C 21/002* (2013.01); *A01C 23/007* (2013.01)

(58) Field of Classification Search
CPC ... A01M 7/0089; A01B 79/005; A01C 23/007
See application file for complete search history.

(56) References Cited

U.S. PATENT DOCUMENTS 4,093,107 A * 6/1978 Allman ............... A01M 7/0089
 222/23
4,220,998 A * 9/1980 Kays ................... A01M 7/0089
 239/162

(Continued)

OTHER PUBLICATIONS

Case IH, Installation & Operation Manual: Viper Pro for use with Case IH Patriot Sprayers & 610 Liquid System Applicators; Part No. 016-0171-152 Rev F; Feb. 2012—(258) Pages.

(Continued)

*Primary Examiner* — Frederick M Brushaber
(74) *Attorney, Agent, or Firm* — Rebecca L. Henkel; Rickard K. DeMille

(57) ABSTRACT

An improved system of determining the speed at which an agricultural vehicle is traveling is disclosed. A control system for the sprayer receives feedback signals from multiple sensors, where each feedback signal may be utilized to determine the speed at which the sprayer is traveling. An operator interface, such as a touch-screen terminal, is provided to receive input from the operator for selecting one of the feedback signals. Each of the feedback signals has certain operating conditions under which they are more or less reliable. The operator may select one of the feedback signals from which the speed of the sprayer is determined according to the present operating conditions. The speed determined from the selected feedback signal is then used by the sprayer to control and record application of product to the field.

7 Claims, 4 Drawing Sheets

(51) Int. Cl.
*A01B 79/00* (2006.01)
*A01C 23/00* (2006.01)

(56) References Cited

U.S. PATENT DOCUMENTS

| | | | | |
|---|---|---|---|---|
| 4,301,944 | A * | 11/1981 | Lestradet | A01M 7/0089 222/55 |
| 4,523,280 | A | 6/1985 | Bachman | |
| 4,715,012 | A * | 12/1987 | Mueller, Jr. | A01B 63/112 701/50 |
| 4,803,626 | A * | 2/1989 | Bachman | A01M 7/0089 118/323 |
| 5,260,875 | A * | 11/1993 | Tofte | A01B 79/005 111/903 |
| 5,574,657 | A * | 11/1996 | Tofte | A01C 23/007 700/240 |
| 5,809,440 | A | 9/1998 | Beck et al. | |
| 5,924,371 | A * | 7/1999 | Flamme | A01B 79/005 111/177 |
| 5,956,255 | A * | 9/1999 | Flamme | A01B 79/005 111/903 |
| 6,009,354 | A * | 12/1999 | Flamme | A01B 79/005 172/4.5 |
| 6,024,035 | A * | 2/2000 | Flamme | A01B 79/005 111/178 |
| 6,070,538 | A * | 6/2000 | Flamme | A01B 79/005 111/170 |
| 6,091,997 | A * | 7/2000 | Flamme | A01B 79/005 111/903 |
| 6,094,617 | A * | 7/2000 | Lapke | F02D 41/1497 123/350 |
| 6,615,137 | B2 | 9/2003 | Lutter et al. | |
| 6,801,942 | B1 | 10/2004 | Dietrich et al. | |
| 6,810,315 | B2 * | 10/2004 | Cessac | A01B 79/005 239/11 |
| 6,885,968 | B2 | 4/2005 | Breed et al. | |
| 7,062,368 | B2 * | 6/2006 | Ho | A01D 41/1274 475/72 |
| 7,706,926 | B2 | 4/2010 | Peterson | |
| 7,839,301 | B2 | 11/2010 | Doherty et al. | |
| 8,191,795 | B2 | 6/2012 | Grimm et al. | |
| 8,191,798 | B2 | 6/2012 | Hahn et al. | |
| 8,287,055 | B2 | 10/2012 | Lee | |
| 8,365,679 | B2 | 2/2013 | Landphair et al. | |
| 8,478,493 | B2 | 7/2013 | Anderson | |
| 8,649,930 | B2 | 2/2014 | Reeve et al. | |
| 8,950,260 | B2 | 2/2015 | Gelinske et al. | |
| 8,965,691 | B1 | 2/2015 | Lombrozo | |
| 8,989,956 | B2 | 3/2015 | Dunst et al. | |
| 9,655,355 | B2 * | 5/2017 | Brooks | A01M 7/0089 |
| 2003/0097213 | A1 * | 5/2003 | Cessac | A01B 79/005 701/50 |
| 2013/0320105 | A1 | 12/2013 | Schmidt | |
| 2016/0316616 | A1 * | 11/2016 | Brooks | A01M 7/0089 |
| 2017/0223946 | A1 * | 8/2017 | Brooks | A01M 7/0089 |

OTHER PUBLICATIONS

Air Seed GPS Speed Sensor Kit from Spaldings; (2) pages: Reference Notes Retrieved from: https://www.spaldings.co.uk/ProductDetails.aspx?SubcatID=774&GroupID=11537&tree=1; website accessed Apr. 4, 2015.

* cited by examiner

APPARATUS FOR DETERMINING AN APPLICATION RATE FOR A PRODUCT DELIVERED BY AN AGRICULTURAL VEHICLE

CROSS-REFERENCE TO RELATED APPLICATION

This application is a divisional of U.S. application Ser. No. 14/699,724, filed Apr. 29, 2015.

FIELD OF THE INVENTION

The invention relates generally to agricultural product application equipment such as self-propelled sprayers and, in particular, to a system for selecting between multiple speed sensors to provide a speed input signal for controlling application of product.

BACKGROUND OF THE INVENTION

Agricultural vehicles are used under a wide range of operating conditions. The vehicles are used outdoors and may be required to traverse a paved road to move from a storage facility to a field and then traverse an unpaved surface getting to and working in the field. The vehicles may further be required to operate at varying speeds or under varying loads depending on the type of crops, tillage method, or the particular application being performed.

Sprayers, as a specific type of agricultural vehicle, may apply liquid or dry products, such as fertilizers, herbicides, and/or pesticides to a field. The sprayer typically includes a holding tank in which the product may be loaded prior to transport to a field or while in the field. The sprayer may subsequently travel to the field and apply the product to the field. Certain products may be applied prior to or shortly after planting, prior to emergence of the crop. Other products may need to be applied during the various stages of the growth cycle of the crop. In order to control the track and/or control the rate at which product is applied to the field, the speed at which the vehicle is traveling and the flow rate at which the product is dispensed must be known.

Historically, sprayers have utilized a radar signal to determine the speed at which the sprayer is travelling. The radar signal is transmitted from a radar source mounted to the sprayer, reflected off an external object and returned to a receiver on the sprayer. The radar system generates a pulse train, corresponding to the speed at which the vehicle is traveling and provides the pulse train to an input on a rate controller. The rate controller may then adjust the flow rate of the product being dispensed according to the pulse train input to maintain a desired application rate of the product being dispensed.

Because the sprayers are operated outdoors and throughout the growing cycle, they are subject to a wide variety of operating conditions that may impact the speed feedback signal. Varying weather conditions, such as rain, obstructions in the field, or the crops, such as wheat or corn, as they grow may interfere with the radar signal transmitted from the sprayer. As a result, the speed feedback signal may be inaccurate and the sprayer may apply an undesired amount of product to the field.

Thus, it would be desirable to provide an improved system of determining the speed at which the sprayer is traveling.

SUMMARY OF THE INVENTION

The present invention discloses an improved system of determining the speed at which an agricultural vehicle is traveling. A control system for the sprayer receives feedback signals from multiple sensors, where each feedback signal may be utilized to determine the speed at which the sprayer is traveling. An operator interface, such as a touch-screen terminal, is provided to receive input from the operator for selecting one of the feedback signals. The feedback signals may include, for example, a radar signal, a wheel speed sensor, a transmission speed pickup, or a Global Position Signal (GPS). Each of the feedback signals has certain operating conditions under which they are more or less reliable. The operator may select one of the feedback signals from which the speed of the sprayer is determined according to the present operating conditions. The speed determined from the selected feedback signal is then used by the sprayer to control and record application of product to the field. Optionally, the operator may opt for automatic selection of the feedback signal.

According to one embodiment of the invention, apparatus for determining an application rate for a product delivered by an agricultural vehicle is disclosed. The apparatus includes a plurality of sensors, each of the plurality of sensors operable to generate a signal responsive to motion of the agricultural vehicle, and a controller in communication with each of the plurality of sensors to receive the signal generated by each sensor. The controller is operable to determine which of the signals from the plurality of sensors is a desired feedback signal, convert the desired feedback signal to a speed feedback signal corresponding to a speed at which the agricultural vehicle is moving, and determine the application rate for the product to be delivered responsive to converting the desired feedback signal to the speed feedback signal.

According to another aspect of the invention, the controller includes a first controller and a second controller. The first controller is in communication with each of the plurality of sensors to receive the signal generated by each sensor and is operable to: determine which of the signals from the plurality of sensors is the desired feedback signal, convert the desired feedback signal to the speed feedback signal corresponding to the speed at which the agricultural vehicle is moving, and transmit the speed feedback signal via at least one of a dedicated speed output and a communication bus. The second controller is in communication with the first controller to receive the speed feedback signal from at least one of the dedicated speed output and the communication bus and is operable to determine the application rate for the product to be delivered responsive to receiving the speed feedback signal from the first controller.

According to another aspect of the invention, the speed feedback signal may be a series of pulses varying in frequency as a function of the speed at which the agricultural vehicle is moving, and the series of pulses may be transmitted to the second controller via the dedicated speed output. Optionally, the speed feedback signal is a value stored in a register of the first controller, and the value is transmitted to the second controller via a data packet on the communication bus.

According to yet another aspect of the invention, the first controller includes a memory storing at least one performance criterion for each signal from the plurality of sensors. Multiple operational sensors on the agricultural vehicle each provide a signal corresponding to operation of the agricultural vehicle to the first controller, and the first controller selects the signal from the operational sensors to be converted to the speed feedback signal as a function of the performance criterion and of the operation of the agricultural vehicle.

According to still another aspect of the invention, the agricultural vehicle includes a cab in which an operator rides. A user interface within the cab is in communication with the first controller. The user interface may provide a prompt to the operator for selection of one of the sensors and may receive an input from the operator corresponding to one of the sensors. The first controller is operable to receive the input from the user interface corresponding to one of the sensors and the signal converted to the speed feedback signal is from the sensor selected by the operator. The sensors may include at least three sensors and may selected from among a radar system, a wheel speed sensor, an antenna in communication with a navigation system, and transmission pickup. It is further contemplated that one of the sensors may be mounted either to a frame or to a wheel of the agricultural vehicle. In addition, one of the sensors may be in communication with a satellite navigation system.

According to another embodiment of the invention, a method for controlling operation of an agricultural vehicle as a function of the speed at which the agricultural vehicle is traveling over a surface is disclosed. A controller receives a signal from each of multiple sensors at a controller. Each sensor is operable to generate the signal responsive to motion of the agricultural vehicle. An input from a user interface is also received at the controller, where the input identifies one of the plurality of sensors from which a speed feedback signal is generated. The signal received from the identified sensor is converted to the speed feedback signal. According to one aspect of the invention, the signal from a first of the plurality of sensors is in a first format, the signal from a second of the plurality of sensors is in a second format, and each of the signals is converted to a single format for the speed feedback signal. Operation of the agricultural vehicle is controlled as a function of the speed feedback signal.

According to another aspect of the invention, the speed feedback signal may be a series of pulses varying in frequency as a function of the speed at which the agricultural vehicle is moving and control of the agricultural vehicle includes the steps of receiving a clock signal at the controller, determining a duration between successive pulses from the series, of pulses as a function of the clock signal, reading a conversion factor from a memory device with the controller, and generating a velocity signal as a function of the duration between successive pulses and the conversion factor. The conversion factor identifies the number of pulses during a predefined duration expected from the signal converted to the speed feedback signal. Optionally, the speed feedback signal may be a value stored in a memory device of the first controller and control of the agricultural vehicle further includes reading a conversion factor from a memory device with the controller and generating a velocity signal as a function of the value stored in the memory device and the conversion factor.

According to yet another aspect of the invention, the agricultural equipment may be operating and converting the signal from the identified sensor to a speed feedback signal based on a signal from the first of the plurality of sensors. The controller may receive a new input from the user interface identifying the signal from the second of the plurality of sensors to generate the speed feedback signal and switch the signal from the first of the plurality of sensors to the signal from the second of the plurality of sensors for conversion to the speed feedback signal during operation of the agricultural equipment.

According to still another embodiment of the invention, a method for determining an application rate for a product delivered by an agricultural vehicle is disclosed. A signal from each of a plurality of sensors is received at a controller, where each sensor generates the signal responsive to motion of the agricultural vehicle. An input from a user interface is also received at the controller, where the input identifies one of the sensors. The signal from a first of the plurality of sensors is in a first format, the signal from a second of the plurality of sensors is in a second format, and each of the signals is converted to a single format for the speed feedback signal. The signal received from the identified sensor is converted to a speed feedback signal, and the application rate for the product delivered by the agricultural vehicle is determined as a function of the speed feedback signal. It is contemplated that the controller may include a first controller and a second controller, the signal from each of the plurality of sensors is received at the first controller, the input from the user interface is received at the first controller, the signal received from the identified sensor is converter to a speed feedback signal at the first controller, and the application rate is determined at the second controller. The speed feedback signal may be transmitted from the first controller to the second controller between the steps of converting the signal and determining the application rate.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
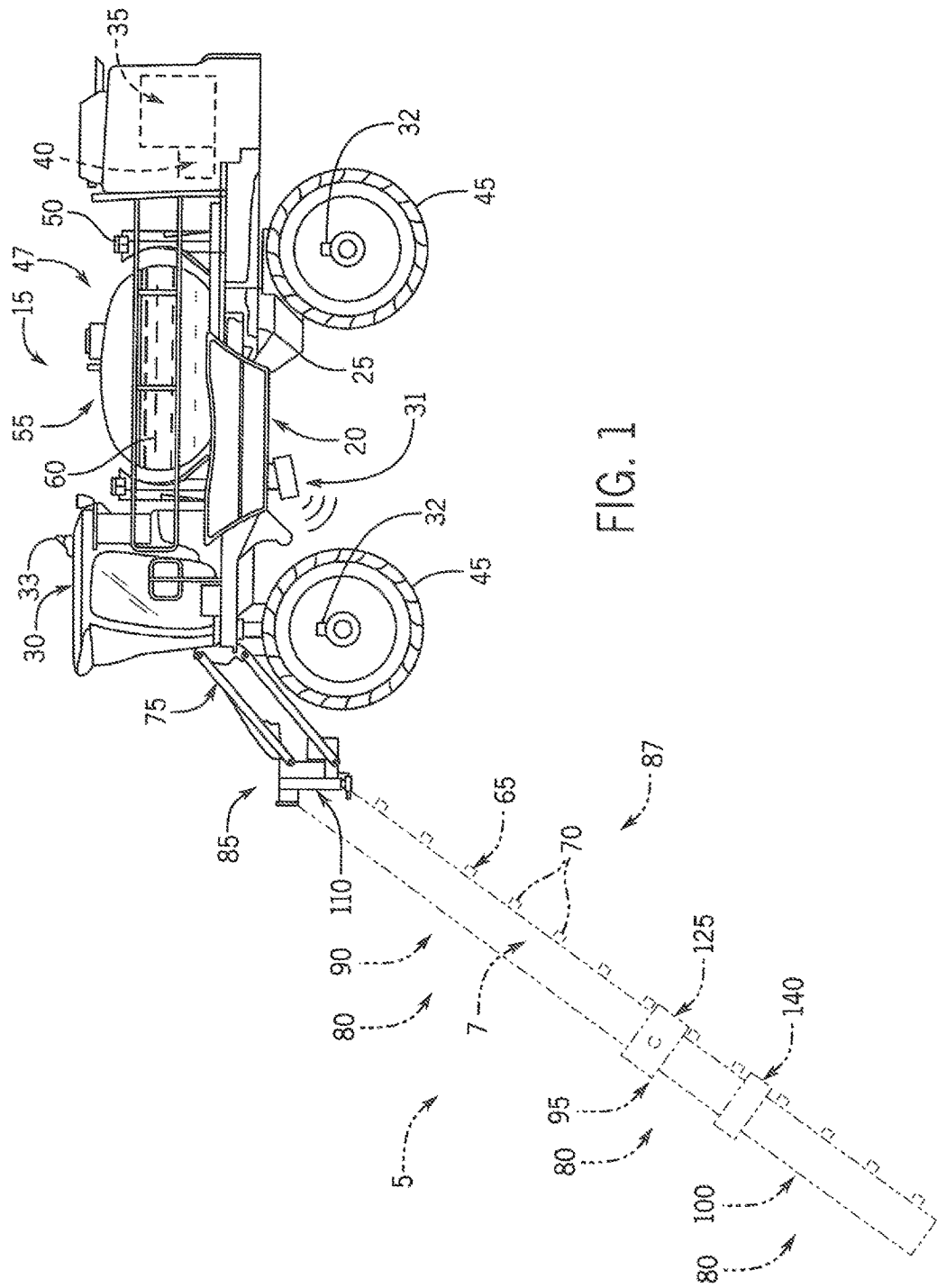
FIG. 1 is a is a side elevation of a self-propelled sprayer with a sprayer boom system with multi-direction section activation control according to one embodiment of the present invention.

Referring now to the drawings and specifically to FIG. 1, a sprayer boom system 5 is provided that includes a boom 7 with multi-direction section activation control is shown for use with an agricultural applicator. The agricultural applicator is a machine that deposits, for example, liquid as well as dry and gaseous product, above and below ground, pre-emerge and post-emergence or sprouting of the crop, which includes operations such as seeding, inter-seeding, fertilizing and application of, for example, herbicides, fungicides, and insecticides as well as soil conditioners, growth retardants, and other agents, such as by way of various toolbar attachments, planters, anhydrous ammonia applicators, and others. The agricultural applicator may be a sprayer and is shown here as a self-propelled agricultural sprayer vehicle or self-propelled sprayer 15. Although the sprayer 15 is shown as a front-mounted boom self-propelled sprayer, it is understood that self-propelled versions of the sprayer 15 can have either front-mounted, mid-mount, or rear-mounted booms, such as those available from CNH Industrial, including the Miller Nitro and Condor Series sprayers and New Holland Guardian Series sprayers, as well as pull-type or towed sprayers, boom-less sprayers, tiered booms, and detachable sprayers.

Figure 2:
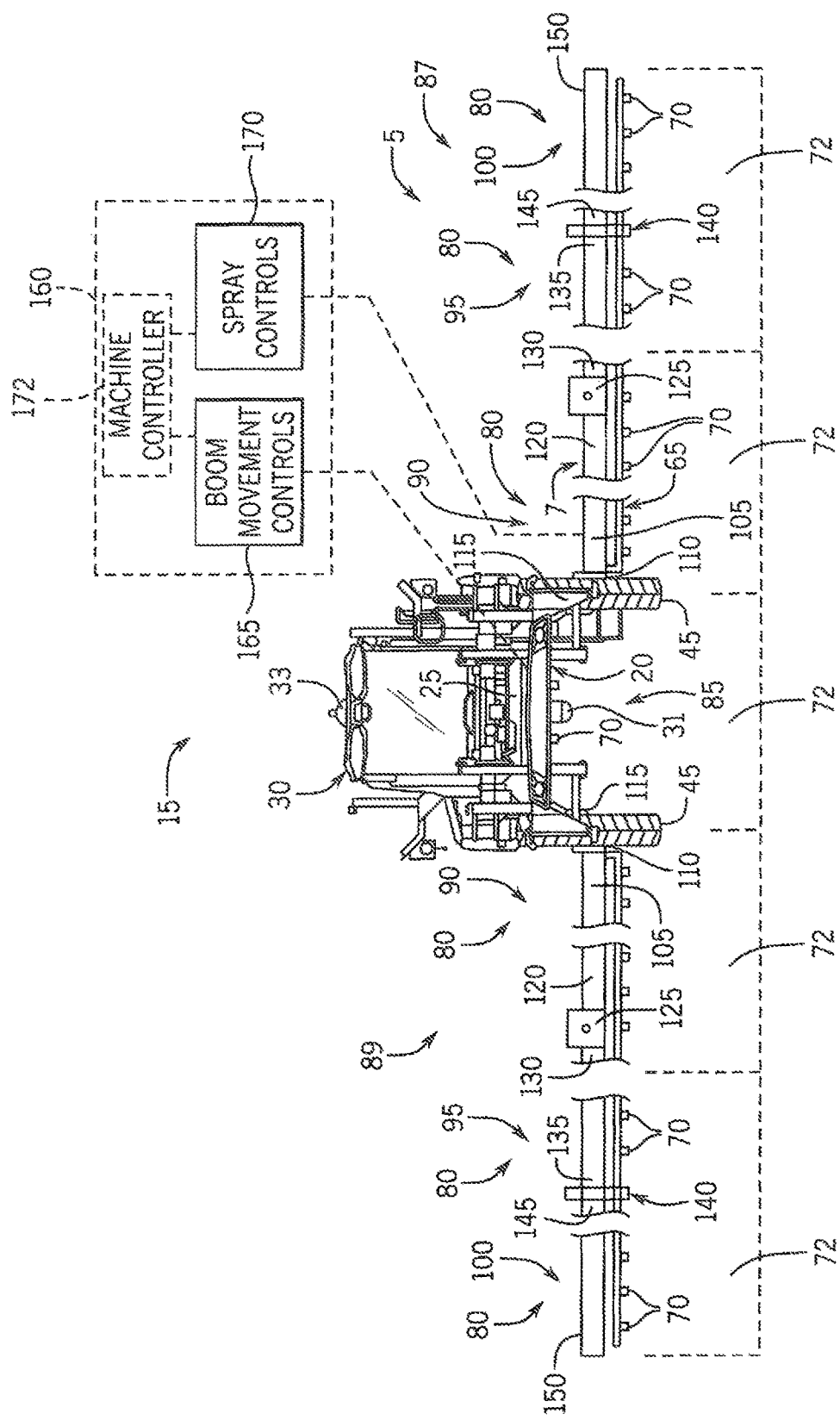
FIG. 2 is a front elevation of a sprayer boom system with multi-direction section activation control according to one embodiment of the present invention.

Still referring to FIG. 1, the sprayer 15 includes a chassis 20 having a chassis frame 25 that supports various assemblies, systems, and components. These various assemblies, systems, and components include a cab 30 in which the operator may ride, an engine 35, and a hydraulic system 40. The hydraulic system 40 receives power from the engine 35 and includes at least one hydraulic pump which may be in a hydrostatic arrangement for providing hydraulic pressure for operating hydraulic components within the hydraulic system 40. For sprayers with hydrostatic drives, hydraulic motors are operatively connected to the hydraulic pump(s) for the rotating wheels 45. In mechanical drive applications, a mechanical transmission receives power from the engine 35 and delivers power for the rotating wheels 45 by way of power-transmitting driveline components such as drive shafts, differentials, and other gear sets in portal, drop boxes, or other housings. An application system, shown as a spraying system or spray system 47, includes storage containers such as a rinse tank 50 storing water or a rinsing solution and a product tank 55 that stores a volume of product 60 for delivery onto an agricultural field with the sprayer 15. The product 60 includes any off variety of agricultural liquid products, such as various pesticides, herbicides, fungicides, liquid fertilizers, and other liquids including liquid suspensions beneficial for application onto agricultural fields. A product delivery pump conveys the product 60 from the product tank 55 through plumbing components such as interconnected pieces of tubing and through a boom tubing system 65 for release out of application or spray nozzles 70 that are spaced from each another along the width of boom 7 during spraying operations. Referring also to FIG. 2, groups or banks of multiple adjacent spray nozzles 70 define multiple application sections shown as spray sections 72 of the spray system 47. The spray sections 72 are defined along the boom 7 and selectively deliver product 60 for release onto an agricultural field at locations corresponding to positions of activated spray sections 72. The boom 7 is connected to the chassis 20 with a lift arm assembly 75 (FIG. 1) that is configured to move the boom 7 up and down for adjusting the height of application of the product 60.

Still referring to FIG. 2, the boom 7 includes multiple boom segments 80 connected longitudinally to provide the corresponding width of the assembled boom 7. The boom segments 80 include a center section 85 and left and right boom arms 87, 89 extending in opposite directions from the center section 85. The left and right boom arms 87, 89 have multiple segments with pairs of primary boom segments 90, secondary boom segments 95, and breakaway boom segments 100 extending in opposite directions along the respective left and right boom arms 87, 89, mirrored about a longitudinal axis, of the sprayer 15. The corresponding left and right segments of the pairs of primary, secondary, and breakaway boom segments 90, 95, 100 are substantially identical, so only one will be described, with the description applying to both the left and right segments of the left and right boom arms 87, 89. The primary boom segment 90 has a primary boom inner end 105 that is connected with hinge 110 to the center section outer end 115. The hinge 110 is configured to allow for generally rearward horizontal pivoting of the boom primary, secondary, and breakaway segments 90, 95, 100 toward the chassis 20 when folding the boom 7 to achieve a stored position. The primary boom segment 90 extends from primary boom inner end 105 away from the center section 85 to primary boom outer end 120. Another hinge 125 is arranged between the primary boom outer end 120 and the secondary boom inner end 130 and is configured to allow for folding the secondary and breakaway segments 95, 100 relative to the primary boom segment 90 to achieve the stored position. For horizontal folding of the secondary and breakaway segments 95, 100 against the primary boom segment 90, the hinge 125 allows horizontal pivoting of the secondary and breakaway segments 95, 100 toward the primary boom segment 90. For vertical folding of the secondary and breakaway segments 95, 100 against the primary boom segment 90, the hinge 125 allows vertical pivoting of the secondary and breakaway segments 95, 100 toward the primary boom segment 90. The secondary boom segment 95 extends from secondary boom inner end 130 away from primary boom segment 90 to a secondary boom outer end 135. A breakaway joint 140 is arranged between the secondary boom outer end 135 and a breakaway boom inner end 145. The breakaway joint 140 is configured to allow for momentary deflecting of the breakaway boom segment 100 away from its outwardly extended position during collisions with the crops, the ground and/or other obstacles. The breakaway boom segment 100 extends from the breakaway boom inner end 145 away from the secondary boom segment 95 to a breakaway boom outer end 150. In the stored position for the boom 7, the secondary and breakaway boom segments 95, 100 are folded against the primary boom segment 90. The primary boom segment 90 is folded toward the chassis 20 so that the breakaway boom outer end 150 is near the primary boom inner end 105 tucked toward the front of the sprayer 15 and that the primary boom outer end 120 and the secondary boom inner end 130 are tucked toward the back of the sprayer 15.

Figure 3:
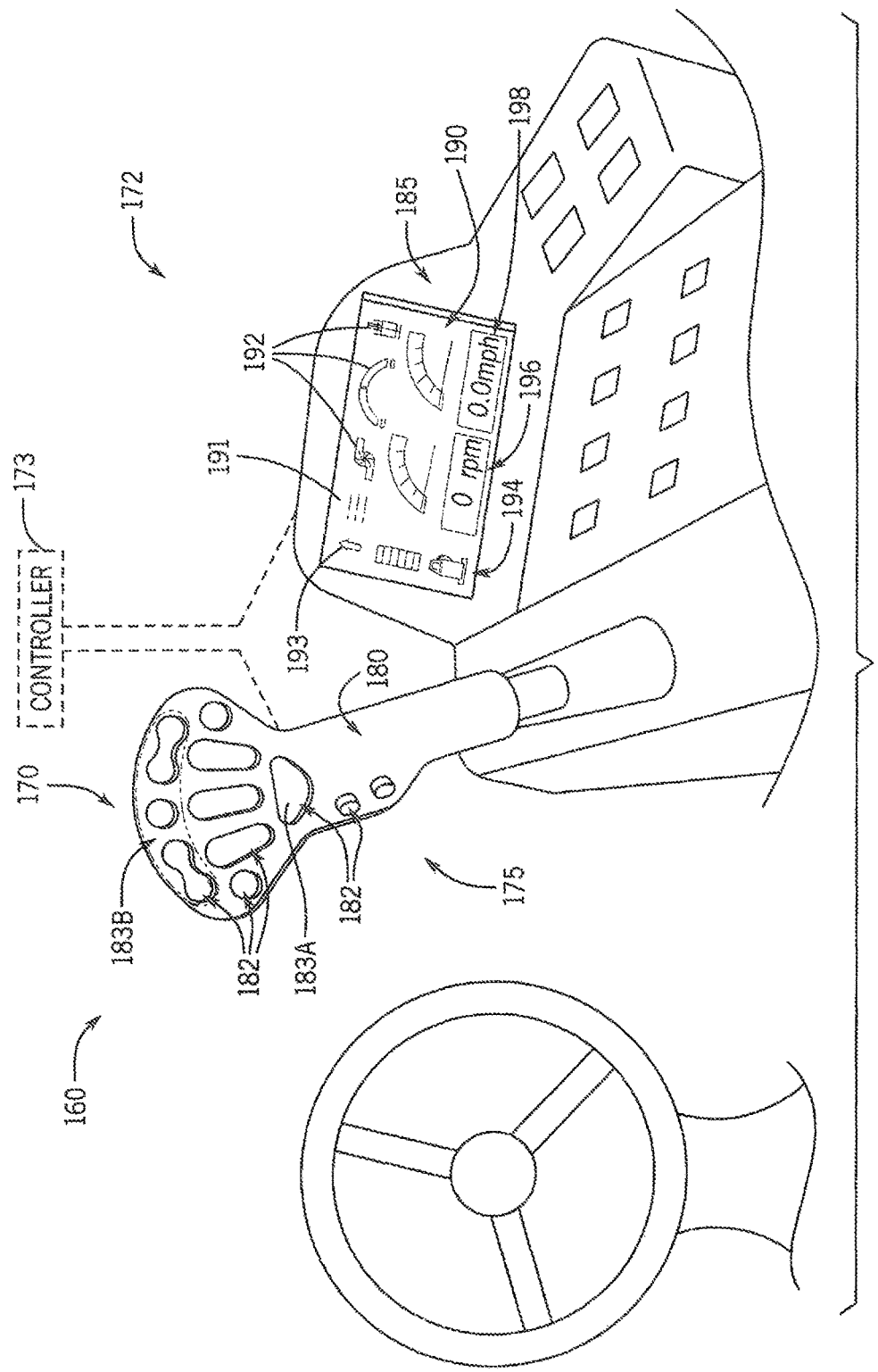
FIG. 3 is a simplified partial schematic pictorial view of a control system incorporated in the sprayer of FIG. 2.

Still referring to FIG. 2, a control system 160 may include various control subsystems including, but not limited to, a boom position control system 165, a spray section control system 170, also referred to herein as a rate controller, and a machine controller 172. The boom position control system 165 is configured to control movements of the boom 7 such as height adjustments, folding procedures, and unfolding procedures. The spray section control system 170 is configured to selectively deactivate and activate spray sections 72 and/or to vary the flow rate at which product is dispensed from each spray section 72. With reference also to FIG. 3, the machine controller 72 includes a microprocessor-based controller 173 mounted on the machine. The microprocessor-based controller 173 may be implemented as a programmable logic controller (PLC) or other industrial computer, along with corresponding software and suitable memory for storing such software. The machine controller 172 may further include hardware such as inputs and outputs for receiving signals from and providing signals to sensors, actuators, or other electro-mechanical or hydraulic components of the sprayer 15 along with interconnecting conductors between the controller 173 and the controlled devices.

Still referring to FIG. 3, the control system 160 has multiple user interfaces that allow for operator control of the systems and components of sprayer 15. The operator control interfaces may include a joystick 175 and a monitor 185 with a touchscreen 190 as an Human Machine Interface (HMI). Although shown as a single HMI, it is understood that multiple HMI's may be implemented such as an in-cab HMI and another at a load station, or a portable HMI via an electronic tablet application program or dedicated HHD (hand held device) either wireless or tethered to control system 160. The operator may additionally provide a field computer (not shown) that may be configured to interface either via a wired, or wireless connection with the machine controller 172. The field computer may include software configurable at a remote location, such as an office, to control precision agriculture-type procedures, as well as various components and systems of the sprayer 15 in one or more application locations. The joystick 175 includes a grip 180 with various grip buttons 182 for controlling corresponding functions of sprayer 15 including movement characteristics such as range and speed controls, as well as functions of the boom position control and spray section control systems 165, 170. According to the illustrated embodiment, the grip buttons 182 include, a master button 183A that turns on or activates all the spray sections 72 when pressed once and when pressed again will shut off or deactivate all the spray sections 72. The grip spray control buttons 183B are configured for indexing and controlling the deactivation and activation of the spray sections 72. The touchscreen 190 may also have buttons displayed as icons or graphical buttons 192 that may be selected to also control the deactivation and activation of the spray sections 72. Thus, an operator may implement various requests through the field computer, joystick 175, touchscreen 190 or a combination thereof for controlling functions of the sprayer 15. The monitor 185 may also display status and operating parameters of the sprayer 15 such as fuel level 194, engine revolutions per minute 196, and vehicle speed 198. The status items and operating parameters displayed may vary based on the selections from a menu 191. A home icon 193 may be pressed to return the display 185 to a predefined "home" screen.

Figure 4:
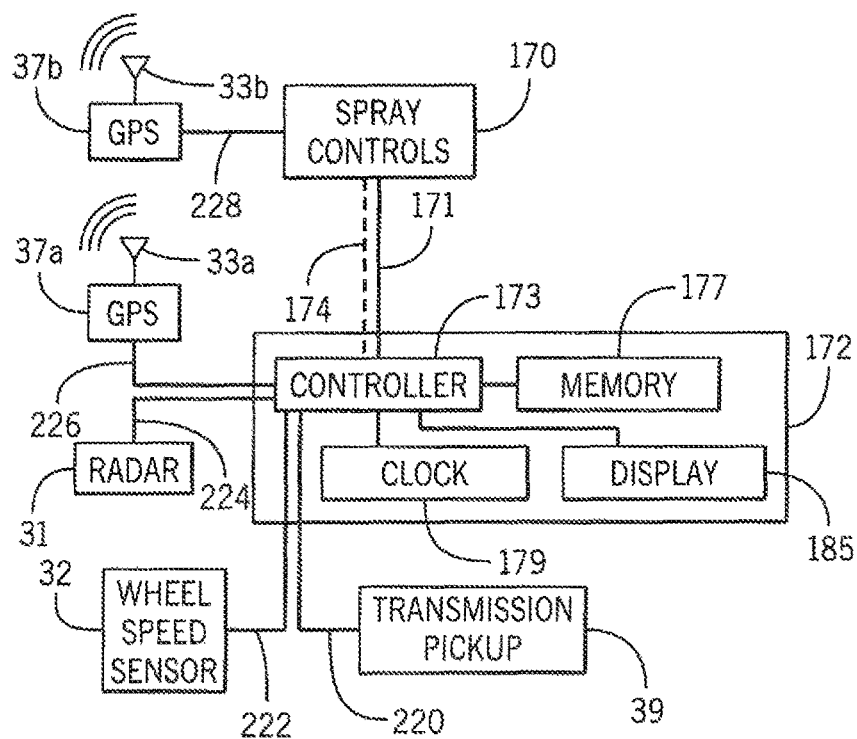
FIG. 4 is a partial block diagram representation of the control system of FIG. 3.

According to one embodiment of the invention, the sprayer 15 includes multiple sensors configured to generate, a signal corresponding to motion of the sprayer 15. Each sensor may generate a signal according to a unique format, including, but not limited to a pulse train, an analog or digital signal, a radio frequency signal, and a message packet. The signal provides information on motion of the sprayer 15 which may be a position, a change in position, a speed, or a change in speed. Referring again to FIGS. 1 and 2, one of the sensors on the sprayer 15 may be a radar system 31 configured to emit pulses of radio waves and to detect radio waves reflected back to the radar system 31 after bouncing off an object. The radar system 31 utilizes the reflected waves to determine a speed at which the sprayer 15 is traveling. Referring also to FIG. 4, the radar system 31 generates a signal 224 corresponding to the reflected waves and/or the vehicle speed and transmits the signal 224 to the controller 173.

Another sensor on the sprayer 15 may be one or more wheel speed sensors 32. The wheel speed sensor 32 may be a proximity sensor detecting either a single target or multiple targets oriented to pass by the proximity sensor during each revolution of the wheel. Alternately, the wheel speed sensor 32 may be a resolver or an encoder configured to generate, for example, a sinusoidal signal or a series of pulses corresponding to the angular position or change in angular position of the wheel. Referring also to FIG. 4, the signal 222 from the wheel speed sensor 32 is transmitted to the controller 173 where the signal 222 corresponding to angular position may be converted to an angular velocity signal and/or to a vehicle speed signal.

Still another sensor on the sprayer 15 may be an antenna 33 in communication with a navigation system, such as the Global Positioning System (GPS). The antenna 33a may be operatively connected directly to the controller 173 or to a dedicated GPS controller 37a for communication with the navigation system. According to the illustrated embodiment, the GPS controller 37 is in communication with multiple satellites in the navigation system to determine the present location of the GPS controller 37. The GPS controller 37a generates a signal 226 corresponding to its present location and transmits the signal 226 to the controller 173. The machine controller 172 may also include a clock 179 operable to generate a clock signal, corresponding to the present time, or to generate a pulse train at a known frequency, such that the time between pulses is similarly known. The controller 173 monitors the position signal 226 from the satellite navigation system and the clock signal to detect changes in position and a corresponding duration over which the change in position occurred. The controller 173 may then determine a speed feedback signal based on the change in position and the corresponding change in time.

The sprayer 15 may also include a sensor in the transmission, engine, or along the drive train to determine, for example, the revolutions per minute (rpm) of the transmission, engine 35, or drive line. According to the illustrated embodiment, a sensor 36 is provided to detect a rotational speed in the transmission. The transmission pickup 39 provides a signal 220 back to the controller 173 corresponding to the rpm of the transmission. The transmission pickup 39 may be provided at an input or output of the transmission or at an intermediate gear within the transmission. Characteristics of the sprayer 15 may be stored in the memory 177 of the machine controller 172, such as the gear ratio and/or wheel diameter such that the signal 220 from the transmission pickup 39 is converted to a speed feedback signal for the sprayer 15.

Figure 5:
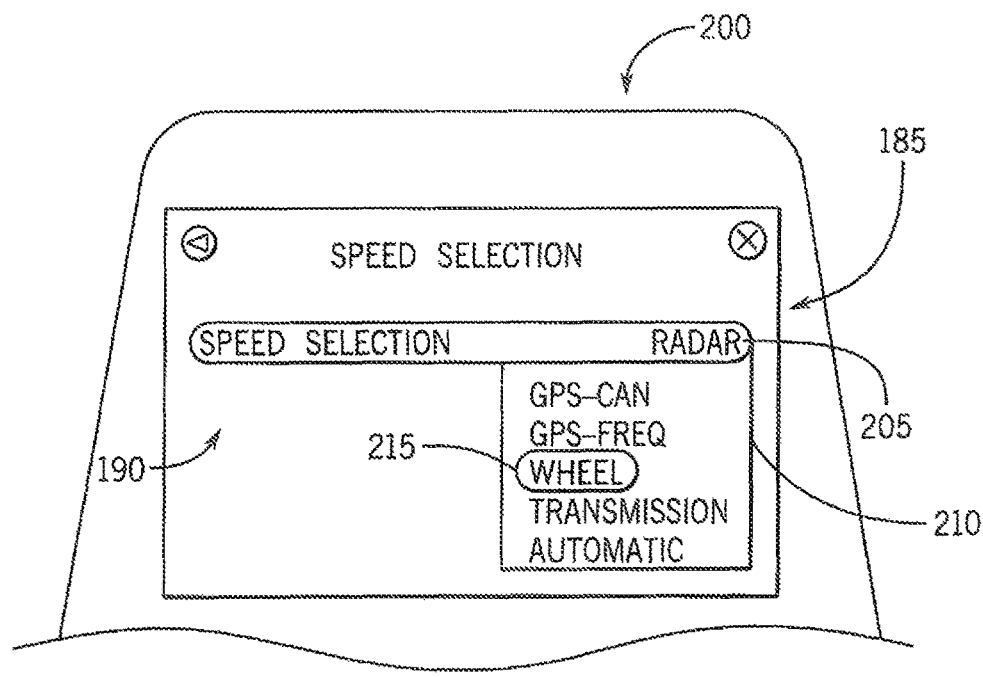
FIG. 5 is an exemplary view of a display screen for selecting the speed input for the control system of FIG. 3.

In operation, the operator may use the touchscreen 190 on the display 185 to select the signal 224, 222, 226, 229 from one of the sensors 31, 32, 37, 39 which the controller 173 will use to generate a speed feedback signal. With reference to FIG. 5, a speed selection screen 200 may be displayed on the touchscreen 190. According to the illustrated embodiment, the speed selection screen 200 includes a text box 205 identifying the currently selected sensor 31, 32, 37, 39 from which the signal 224, 222, 226, 229 is used. A menu 210 may be provided from which the operator may select one of the sensors 31, 32, 37, 39. A new sensor 215 may be highlighted when the operator selects it on the touchscreen 190. The speed selection screen 200 may transition, for example, to a confirmation screen to confirm the change or simply update the text box 205 with the newly selected sensor 31, 32, 37, 39.

It is contemplated that the operator may select one of the sensors 31, 32, 37, 39 based on the current operating conditions. For example, the sprayer 15 may be initially filled with product at a barn or other storage facility. The sprayer 15 may need to travel some distance over paved surfaces to reach the field in which the product is to be applied. The operator may select the wheel speed sensor 32 and/or the transmission pickup 39 knowing that the sprayer 15 will be traveling on a paved surface. Upon reaching the field, the operator may select a different sensor 31, 32, 37, 39. If for example, the field is muddy, the wheels may slip while traversing the field. The wheel speed sensor 32 and transmission pickup 39 will not provide an accurate indication of the speed at which the sprayer 15 is traveling. The operator may select the position signal 226 from the GPS controller 37a from which to determine a speed feedback signal. However, on overcast days or in hilly terrain, the GPS controller 37a may not obtain a clear signal from the satellite navigation system and may report inaccurate position information. Thus, the operator may select the signal 224 from the radar system 31. The radar system 31, however, may be obstructed from certain tall crops, such as corn and provide an inaccurate signal 224 back to the controller 173. As may be observed from the description above, each of the sensors 31, 32, 37, 39 may work well in certain operating conditions and poorly in others. The operator may, therefore, identify the sensor 31, 32, 37, 39 that will provide the most desirable signal according the operating conditions. Further, if the operating conditions change as the sprayer 15 is applying product, the operator may activate the speed selection screen 200 and select a different sensor 31, 32, 37, 39 from which the speed feedback signal is generated.

As discussed above, each of the sensors 31, 32, 37, 39 generates a signal 224, 222, 226, 229 having a different format. The controller 173 converts the signal 224, 222, 226, 229 from each sensor to a speed feedback signal having a single format for transmission to the rate controller 170. The controller 173 may access registers in the memory 177 of the machine controller 172 containing conversion information specific to the signal being used. For example, a wheel speed sensor 32 may generate a certain number of pulses per revolution (ppr), such as 1024 or 2048 ppr. The number of ppr may be stored in memory 177 and retrieved when the wheel speed sensor 32 is selected. The controller 173 monitors the number of pulses received over a certain time and determines the rate at which the wheel is rotating. The controller 173 further may again read from memory a conversion factor based, for example, on the size of the tire that will convert the rate at which the wheel is rotating into a speed at which the sprayer 15 is traveling. Still other conversion factors may be stored in memory 177 for converting signals generated by the other sensors 31, 32, 37, 39.

Having generated a speed feedback signal, the controller 173 transmits the speed feedback signal to the rate controller 170, which will, in turn, adjust the rate at which product is applied to a field. With reference to FIG. 4, two methods of transmitting the speed feedback signal to the rate controller 170 are illustrated. According to one embodiment of the invention, a communication bus 171 may be connected between the machine controller 172 and the rate controller 170. The communication bus 171 may be a single communication bus or multiple busses connected in parallel. The communication bus 171 may be a serial bus system such as a Controller Area Network (CAN) bus and may implement an International Organization for Standardization (ISO) protocol. Optionally, other suitable busses and/or protocols may be utilized without deviating from the scope of the invention. After converting the feedback signal 224, 222, 226, 220 from the respective sensor 31, 32, 37, 39 to a speed feedback signal, the controller 173 may store a value corresponding to the speed at which the sprayer 15 is travelling in memory 177. The controller 173 may then insert the value into a data packet configured for the communication protocol for transmission between the machine controller 172 and the rate controller 170. When the rate controller 170 receives the data packet, the value of the speed feedback signal may be extracted and the rate controller 170 may adjust the flow rate and/or enable/disable spray sections 72 which are applying the product from the sprayer 15.

According to another embodiment of the invention, the machine controller 172 may have a dedicated output and the rate controller 170 may have a dedicated input between which a pulse signal 174 may be transmitted. The pulse signal 174 may be compatible with certain rate controllers 170 and is configured to transmit a series of pulses corresponding to the speed at which the sprayer 15 is traveling. The controller 173 may first convert each of the feedback signals 224, 222, 226, 220 from the respective sensor 31, 32, 37, 39 to a speed at which the sprayer 15 is traveling. The controller 173 may then convert that speed to a series of pulses, where the pulses may vary in frequency according to the speed at which the sprayer 15 is traveling. The pulse signal 174 is transmitted between the machine controller 172 and the rate controller 170. When the rate controller 170 receives the pulse signal 174 it converts the series of pulses back to a speed at which the sprayer 15 is traveling and the crate controller 170 may adjust the flow rate and/or enable/disable spray sections 72 which are applying the product from the sprayer 15.

According to still another aspect of the invention, certain rate controllers 170 may include an antenna 33b and GPS controller 37b. The GPS controller 37b for the rate controller 170 may provide position information to the rate controller 170 which is, in turn, configured to determine a speed at which the sprayer 15 is traveling. However, as discussed above, the antenna 33b and GPS controller 37b may not always receive a signal or receive a clear signal. Thus, the sprayer 15 may include the additional sensors 31, 32, 37, 39 generating their respective feedback signals 224, 222, 226, 220. The speed selection screen 200 may provide as an additional option GPS signal on the rate controller 170 as providing the speed feedback signal by which the rate controller 170 applies product to the field.

According to yet another aspect of the invention, the controller 173 may be set to automatically select one of the feedback signals 224, 222, 226, 220 for determining the speed at which the sprayer 15 is travelling. With reference again to FIG. 5, "AUTOMATIC" may be one of the options in the menu 210 speed selection screen 200. The controller 173 may be configured and/or store performance based criteria on which the automatic selection may be performed. The stored criteria may include an operator's preference, a performance based criterion, or a combination thereof. The operator's preference may include a table where each of the feedback signals 224, 222, 226, 220 are ranked in an order of preference by the operator as to which feedback signal 224, 222, 226, 220 should be used.

Performance based criteria may either entered, for example, via a separate screen on the display 185 or be determined by data stored in the memory 177 of the sprayer 15 over a period of operation. For the GPS controller 37a, performance based criteria may include, for example, the number of satellites in the navigation system, and, in particular, the number of satellites in a "constellation" proximate the location in which the agricultural vehicle is working. Other performance based criteria may include the height of the constellation above the horizon, the signal quality, the broadness of the constellation with respect to the vehicle, or other factors that may impact the quality of the signal transmitted between the antenna 33a and the satellites or the accuracy of the position calculation within the GPS controller 37a. For a transmission pickup 39 or wheel speed sensor 32, the performance based criterion may include, for example, a record of the frequency at which the controller 173 executes a traction control routine, which corresponds to slippage of one or more of the wheels 45, or a standard deviation between pulses received at the controller 173. For the radar 31, the performance based criterion may include a reading of the boom height, which may provide an indication of the height of the canopy for the crops over which the sprayer 15 is traversing, or of a standard deviation between pulses received at the controller 173. Still other variables by which performance of one of the sensors 31, 32, 37, 39 may be evaluated may be manually entry or by recording data and storing the data in memory 177. Automated selection may further be determined by a weighted average of the criteria stored in memory 177. For example, the frequency at which the controller 173 executes a traction control routine may more negatively impact the accuracy of the feedback signal from the speed sensor 32 or transmission pickup 39 than the number of satellites in the constellation around the sprayer 15 impacts the feedback signal from the GPS controller 37a.

In operation, the controller 173 monitors the performance of the sprayer 15 and automatically selects a desired sensor 31, 32, 37, 39 from which the speed feedback signal will be calculated. In a first example, the wheel speed sensor 32 or the transmission pickup 39 may be the preferred sensor. When the field is dry and there is little or no slippage of the wheels 45, the controller 173 may select the wheel speed sensor 32 or the transmission pickup 39. If, however, the field is muddy and the wheels 45 frequently slip, the sprayer 15 may select the GPS sensor 37. In a second example, the GPS sensor 37 may be the preferred sensor. In a first location, the constellation may provide excellent coverage of the field in which the sprayer 15 is operating and the controller 173 selects the OPS sensor 37. In another field, or in a field next to a hill interfering with transmission to one or more satellites, the coverage may be poor and the controller 173 may select the wheel speed sensor 32 or the transmission pickup 39. In either example, under automatic operation, the controller 173 attempts to utilize the best feedback signal 224, 222, 226, 220 from which it can determine a speed feedback signal without requiring operator intervention on the speed selection screen 200.

Many changes and modifications could be made to the invention without departing from the spirit thereof. The scope of these changes will become apparent from the appended claims.

We claim:

1. An apparatus for controlling an application rate for a product delivered by an agricultural vehicle, the apparatus comprising:
   a product applicator configured to apply product to an agricultural field at the application rate;
   a plurality of sensors, each of the plurality of sensors operable to generate a signal responsive to motion of the agricultural vehicle;
   a controller operatively connected to the product applicator and in communication with each of the plurality of sensors to receive the signal generated by each sensor, wherein the controller is operable to:
   determine which of the signals from the plurality of sensors is a desired feedback signal,
   convert the desired feedback signal to a speed feedback signal corresponding to a speed at which the agricultural vehicle is moving, and
   determine an adjusted application rate for the product to be delivered responsive to converting the desired feedback signal to the speed feedback signal; and
   change the application rate of the product applied to the agricultural field by the product applicator to the adjusted application rate.

2. The apparatus of claim 1 wherein the controller includes a first controller and a second controller, wherein:
   the first controller is in communication with each of the plurality of sensors to receive the signal generated by each sensor,
   the first controller is operable to determine which of the signals from the plurality of sensors is the desired feedback signal,
   the first controller is operable to convert the desired feedback signal to the speed feedback signal corresponding to the speed at which the agricultural vehicle is moving,
   the first controller is operable to transmit the speed feedback signal via at least one of a dedicated speed output and a communication bus,
   the second controller is in communication with the first controller to receive the speed feedback signal from at least one of the dedicated speed output and the communication bus, and
   the second controller is operable to determine the adjusted application rate for the product to be delivered responsive to receiving the speed feedback signal from the first controller.

3. The apparatus of claim 2 wherein the speed feedback signal is a series of pulses varying in frequency as a function of the speed at which the agricultural vehicle is moving and wherein the series of pulses are transmitted to the second controller via the dedicated speed output.

4. The apparatus of claim 2 wherein the speed feedback signal is a value stored in a memory of the first controller and wherein the value is transmitted to the second controller via a data packet on the communication bus.

5. The apparatus of claim 2 wherein:
   the first controller includes a memory storing at least one performance criterion for each signal from the plurality of sensors,
   a plurality of operational sensors on the agricultural vehicle provide at least one signal corresponding to operation of the agricultural vehicle to the first controller, and
   the first controller selects the desired feedback signal as a function of the performance criterion and of the operation of the agricultural vehicle.

6. The apparatus of claim 2 wherein the agricultural vehicle includes a cab in which an operator rides, the apparatus further comprising:
   a user interface within the cab in communication with the first controller and operable to provide a prompt to the operator for selection of one of the plurality of sensors and to receive an input from the operator corresponding to one of the plurality of sensors, wherein the first controller is operable to receive the input from the user interface corresponding to one of the plurality of sensors.

7. The apparatus of claim 6 wherein the plurality of sensors includes at least three sensors selected from the group consisting of a radar system, a wheel speed sensor, an antenna in communication with a navigation system, and a transmission pickup.

\* \* \* \* \*